(12) United States Patent
Kismarton

(10) Patent No.: US 10,099,445 B2
(45) Date of Patent: Oct. 16, 2018

(54) SYSTEMS AND METHODS FOR FORMING COMPOSITE MATERIALS

(71) Applicant: THE BOEING COMPANY, Chicago, IL (US)

(72) Inventor: Max Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 394 days.

(21) Appl. No.: 14/711,836

(22) Filed: May 14, 2015

(65) Prior Publication Data
US 2016/0332413 A1    Nov. 17, 2016

(51) Int. Cl.
*B32B 3/26*    (2006.01)
*B32B 37/18*    (2006.01)
*B29C 70/30*    (2006.01)
*B29C 70/54*    (2006.01)

(52) U.S. Cl.
CPC ........... *B32B 3/26* (2013.01); *B29C 70/30* (2013.01); *B29C 70/545* (2013.01); *B32B 37/18* (2013.01); *B32B 2305/08* (2013.01); *B32B 2305/22* (2013.01); *B32B 2313/04* (2013.01); *B32B 2398/00* (2013.01); *B32B 2605/18* (2013.01); *Y02T 50/433* (2013.01)

(58) Field of Classification Search
CPC ....... B32B 2605/18; B32B 3/266; B32B 5/22; B32B 5/24; B32B 5/26; B32B 5/28; B32B 3/26; B32B 37/18; B29C 70/30; B29C 70/545; Y02T 50/433; Y10T 428/24314; Y10T 428/24322; Y10T 428/24298; Y10T 428/19; Y10T 428/192; Y10T 428/195; Y10T 428/197; B64C 1/12

USPC ........ 428/57, 60, 131, 134, 136, 137, 58, 61
See application file for complete search history.

(56) References Cited

U.S. PATENT DOCUMENTS

| | | | |
|---|---|---|---|
| 7,837,148 B2 | 11/2010 | Kismarton | |
| 8,354,156 B2 * | 1/2013 | Taketa | B29C 43/222 428/113 |
| 8,444,087 B2 | 5/2013 | Kismarton | |
| 8,720,825 B2 | 5/2014 | Kismarton | |

(Continued)

FOREIGN PATENT DOCUMENTS

| | | | | |
|---|---|---|---|---|
| EP | 3015258 | 5/2016 | | |
| GB | 2438715 A | * 12/2007 | ............. | B29C 70/14 |
| WO | WO 2006015598 A1 | * 2/2006 | ............. | B29C 70/30 |

OTHER PUBLICATIONS

Extended European Search Report for EP 16168510.2-1703, dated Oct. 13, 2016.

*Primary Examiner* — Catherine A. Simone
(74) *Attorney, Agent, or Firm* — Joseph M. Butscher; The Small Patent Law Group, LLC

(57) ABSTRACT

A composite membrane assembly may include a plurality of stacked composite plies. Each composite ply may include a main body of reinforced fibers connected together with a resin. The main body may include a base connected to an opposed boundary surface through opposed ends and opposed sides. At least one non-orthogonal cut is formed through a thickness of the main body from the base to the boundary surface. The non-orthogonal cut(s) is staggered with respect to at least one other non-orthogonal cut of an adjacent composite ply so that the non-orthogonal cut(s) does not form a contiguous linear cut with the other non-orthogonal cut(s) of the adjacent composite ply.

20 Claims, 8 Drawing Sheets

(56) References Cited

U.S. PATENT DOCUMENTS

| | | |
|---|---|---|
| 8,943,697 B2 | 2/2015 | Kamaraj |
| 8,960,606 B2 | 2/2015 | Diep |
| 2006/0162143 A1 | 7/2006 | Nelson |
| 2007/0289700 A1 | 12/2007 | Nelson |
| 2014/0065372 A1 | 3/2014 | Olson |
| 2014/0150964 A1 | 6/2014 | Schaaf |
| 2014/0151507 A1 | 6/2014 | Woodard |

* cited by examiner

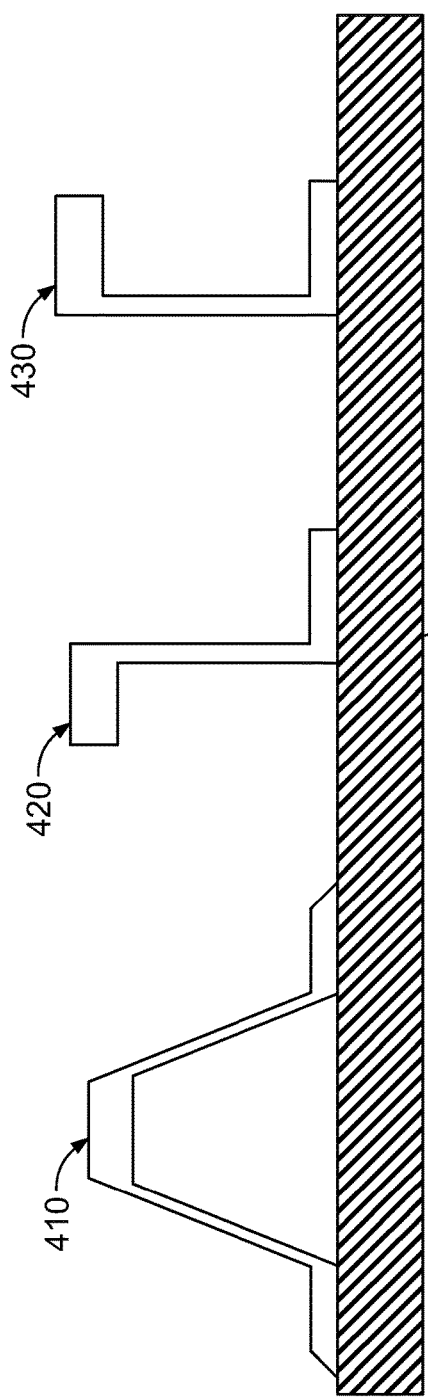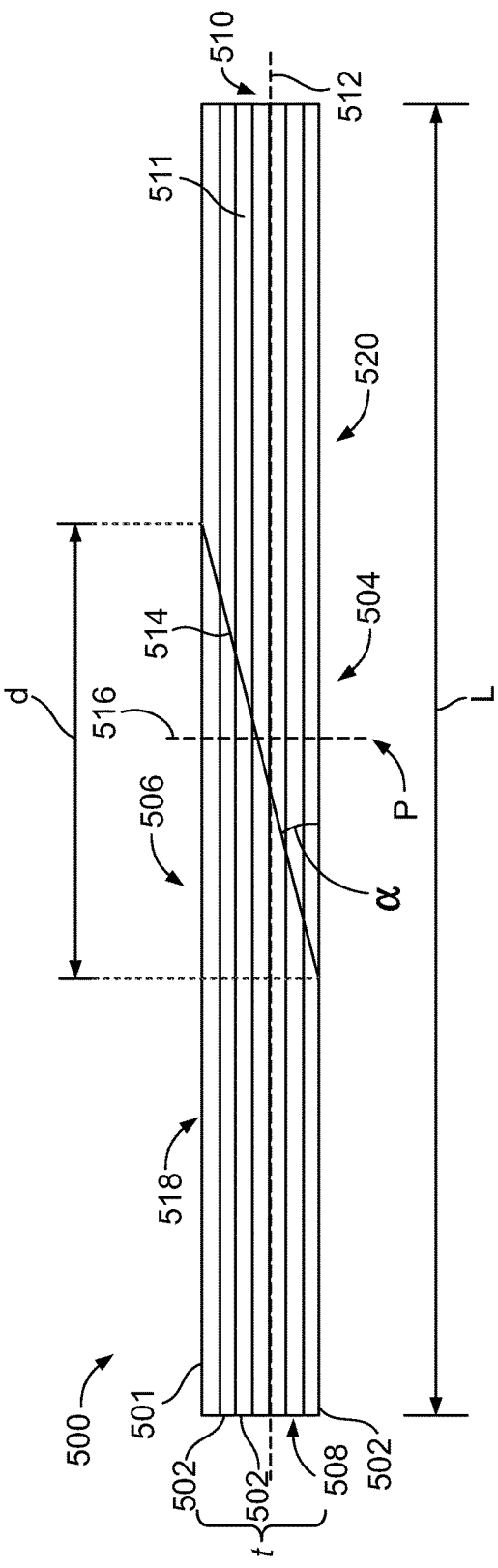

SYSTEMS AND METHODS FOR FORMING COMPOSITE MATERIALS

FIELD OF EMBODIMENTS OF THE DISCLOSURE

Embodiments of the present disclosure generally relate to systems and methods for forming composite materials, and more particularly to systems and methods for forming composite materials that may be used to form aircraft structures.

BACKGROUND OF THE DISCLOSURE

Various structural components are used to form a typical aircraft. For example, wing and empennage surfaces of an aircraft typically include stringers that are coupled to skin members on the wing and empennage surfaces that cooperatively provide a desired flexural and torsional stiffness to the wing and empennage surfaces.

Aircraft structures may be formed from composite materials, which are generally reinforced polymer-based materials used in place of metals, particularly in applications in which relatively low weight and high mechanical strength is desired. Accordingly, composite materials are widely used in a variety of commercial and military aircraft, terrestrial vehicles and consumer products. A composite material may include a network of reinforcing fibers that are generally applied in layers, and a polymeric resin that substantially wets the reinforcing fibers to form a binding contact between the resin and the reinforcing fibers. The composite material may then be formed into a structural component by a variety of known forming methods, such as an extrusion process or other forming processes.

In an aircraft, a stringer may be used to transfer bending loads in skin panels, and stiffen the skin panels in order to prevent buckling, for example. The stringers and skin panels may be made of composite materials, such as carbon fiber reinforced plastic (CFRP). A composite stringer may be fabricated from multiple plies of reinforcing fibers.

Often, composite parts, such as composite stringers, include one or more portions having at least some degree of curvature. Composite parts with even a slight curvature are difficult to construct with 0° uniaxial fiber tape, because the plies within the tape are unable to stretch to comply with long aspect ratio contours.

Current methods of forming contoured stringers, such as with fiber tape, generate wrinkles on or in the stringers. For example, draping a composite membrane assembly, which includes multiple layers of plies, along a contoured (that is, curved, non-straight) surface causes the plies to stretch and/or compress. When the plies are forced to stretch, bridging and resin pooling may result. On the other hand, when the plies are forced to shrink, wrinkles may be formed. In both stretching and shrinking situations, inspection and repair costs increase.

A known method of using fiber tape to form or otherwise conform to curved surfaces includes forming 90° cuts in the fiber tape, and overlapping plies to maintain strength. The cuts are 90° (that is, perpendicular) to a 0° direction of the fiber tape. In particular, the cuts are perpendicular to a longitudinal plane of the fiber tape. By forming the cuts and overlapping portions of the tape, however, the fiber tape increases in thickness, weight, and complexity. Further, the overlapped portions form bumps in the fiber tape. Additionally, while the 90° cuts provide a certain amount of flexibility to the fiber tape, they do not overcome the problems of shrinking and compression. Consequently, such a method does is still susceptible to wrinkling.

Overall strength of a composite part decreases with an increase in the number of wrinkles. Indeed, it has been found that wrinkles in a composite part may reduce strength of the part by 80% or more.

When used to form a flat surface, a composite membrane assembly generally lays flat without wrinkling. As the composite membrane assembly is laid up to form a flat surface or folded over a 90° edge (for example, a single curvature shape), there generally is little or no tension or compression in the membrane, and therefore the composite membrane assembly does not wrinkle. However, as noted, when used to form an arcuate, curved surface (for example, a double curvature shape), the composite membrane assembly is influenced by compression and/or tension, and therefore wrinkles.

Thus, a need exists for an improved system and method of forming a composite material that is able to stretch to accommodate curved surfaces without wrinkling, while substantially maintaining strength.

SUMMARY OF THE DISCLOSURE

Certain embodiments of the present disclosure provide a composite ply configured to form a composite membrane assembly along with a plurality of other composite plies. The composite ply may include a main body of reinforced fibers connected together with a resin, wherein the main body includes a base connected to an opposed boundary surface through opposed ends and opposed sides. At least one non-orthogonal cut is formed through a thickness of the main body from the base to the boundary surface. The non-orthogonal cut(s) may be staggered with respect to at least one other non-orthogonal cut of an adjacent composite ply so that the non-orthogonal cut(s) does not form a contiguous linear cut with the other non-orthogonal cut(s) of the adjacent composite ply. The non-orthogonal cut may form a non-orthogonal angle with respect to a longitudinal plane of the composite ply. The longitudinal plane may extend between opposed ends and may be parallel with one or both of the base and the opposed boundary surface.

In at least one embodiment, the non-orthogonal angle may be at least 5° and no more than 80°. In particular, the non-orthogonal angle may be at least 10° and no more than 20°.

The non-orthogonal cut(s) may form ply segments that are spliced together. In at least one embodiment, the composite ply includes a plurality of non-orthogonal cuts. The plurality of non-orthogonal cuts may all be formed at the same angle. In at least one other embodiment, at least two of the non-orthogonal cuts may be formed at different angles. Further, at least two of the non-orthogonal cuts may be oriented in different directions.

Certain embodiments of the present disclosure provide a composite membrane assembly that may include a plurality of stacked composite plies. Each of the stacked composite plies may include a main body of reinforced fibers connected together with a resin. The main body may include a base connected to an opposed boundary surface through opposed ends and opposed sides. At least one non-orthogonal cut is formed through a thickness of the main body from the base to the boundary surface. The non-orthogonal cut(s) may be staggered with respect to at least one other non-orthogonal cut of an adjacent composite ply so that the non-orthogonal cut(s) does not form a contiguous linear cut with the other non-orthogonal cut(s) of the adjacent composite ply.

Certain embodiments of the present disclosure provide a method of forming a composite membrane assembly. The method may include forming a plurality of composite plies, refraining from cutting first portions of the plurality of composite plies that are to form or conform to a flat surface, forming at least one non-orthogonal angled cut in second portions of the plurality of composite plies that are to form or conform to a double curved surface, and stacking the composite plies together so that the non-orthogonal cuts of adjacent composite plies are staggered with respect to one another.

BRIEF DESCRIPTION OF THE DRAWINGS

FIG. 4 is a diagrammatic representation of different types of aircraft stringer geometries, according to an embodiment of the present disclosure.

FIG. 5 is a diagrammatic representation of a lateral view of a composite ply, according to an embodiment of the present disclosure.

DETAILED DESCRIPTION OF THE DISCLOSURE

Figure 1:
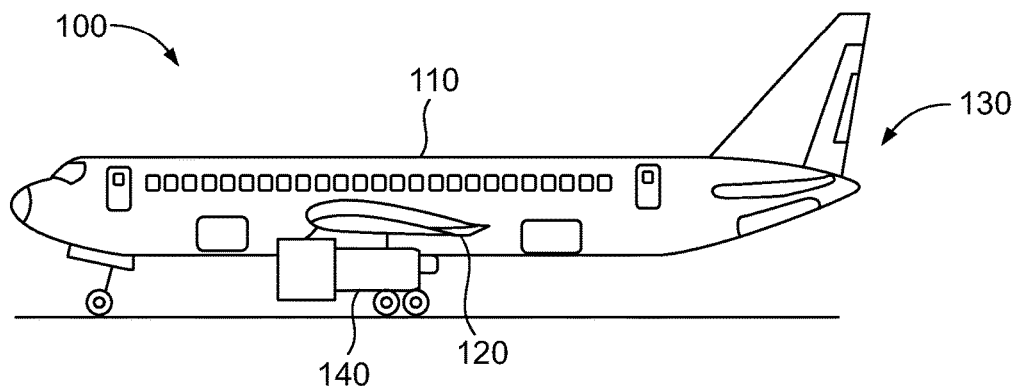
FIG. 1 is a diagrammatic representation of a lateral view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a method of forming plies of composite membrane assemblies through staggered (for example, non-overlapping) angular cuts. The angular cuts may be non-orthogonal. For example, the angular cuts may be between 5°-80° in relation to the 0° direction of each ply. It has been found that an angular cut of 10°-20° may provide a suitable combination of increased flexibility and relatively low loss in strength. It has been found that such angular cuts increase flexibility or stretch by, for example, 2%, while only impacting tape strength by less than 5%, for example.

Embodiments of the present disclosure provide composite plies that include angular cuts that are spread across a relatively long distance (so that each cut is not concentrated at a particular location along a length of the ply), thereby allowing neighboring plies in other orientations to pick up the load through shear. As such, weight may be reduced, and undesirable thickness caused by bumps may be eliminated, minimized, or otherwise reduced.

Certain embodiments of the present disclosure provide composite plies that may be used to form a composite membrane assembly (such as a composite fiber tape, or the like) that may include intermittent angular cuts that are configured to accommodate curvature. The angular cuts accommodate curved surfaces in layups by eliminating or otherwise reducing wrinkles and bumps caused by overlaps.

Certain embodiments of the present disclosure provide a composite laminate structure having multiple plies. The composite laminate structure may include alternating layup of axial and non-axially oriented unidirectional fiber plies. Each axially oriented ply may have a fiber direction in line with a longitudinal axis of the axially oriented ply. Each non-axially oriented ply may have a fiber direction other than a longitudinal axis of the non-axially oriented ply. Angular cuts may be formed in each ply. The angular cuts may be non-orthogonal with respect to a longitudinal axis of each ply. The angular cuts facilitate arcuate or curved contours without buckling or creating voids during a layup or curing process. The angular cuts in adjacent plies may not overlap. Instead, the angular cuts in adjacent plies are staggered or offset with respect to one another. Further, the angle of each angular cut may be the same or different. For example, a first set of angular cuts may be at 10°, a second set of cuts may be at 20°, a third set of cuts may be at −10°, a fourth set of cuts may be at −20°, and so on. In at least one embodiment, angular cuts in adjacent plies may be opposite from one another. In at least one embodiment, the cuts may be between 10° and 45° with respect to the longitudinal axis of a ply.

Embodiments of the present disclosure provide composite membrane assembly that may be used to form various composite structures for an aircraft. For example, embodiments of the present disclosure may be used to form a composite stringer. A composite stringer may be fabricated from multiple plies of reinforcing fibers. Some plies have reinforcing fibers oriented at 0° with respect to an axis of primary loading. As such, these fibers are configured to transfer uniaxial loads. Other plies have reinforcing fibers oriented at +/−45° or +/−90° to transfer shear, transverse, and bearing loads. Accordingly, a stringer may be formed of multiple composite plies, each of which may be configured to transfer uniaxial or shear, transverse and bearing loads. Layers of composite plies may form a composite membrane assembly, which may be used to form a stringer, rib, spar, skin panel, and the like.

FIG. 1 is a diagrammatic representation of a lateral view of an aircraft 100, according to an embodiment of the present disclosure. The aircraft 100 may include a plurality of major assemblies, each of which may be formed of composite materials, which may include composite plies. The major assemblies of the aircraft 100 may include a fuselage 110, wing assemblies 120, and empennage 130. One or more propulsion units 140 may be coupled to the wing assemblies 120, the fuselage 110, and/or other portions of the aircraft 100.

Figure 2:
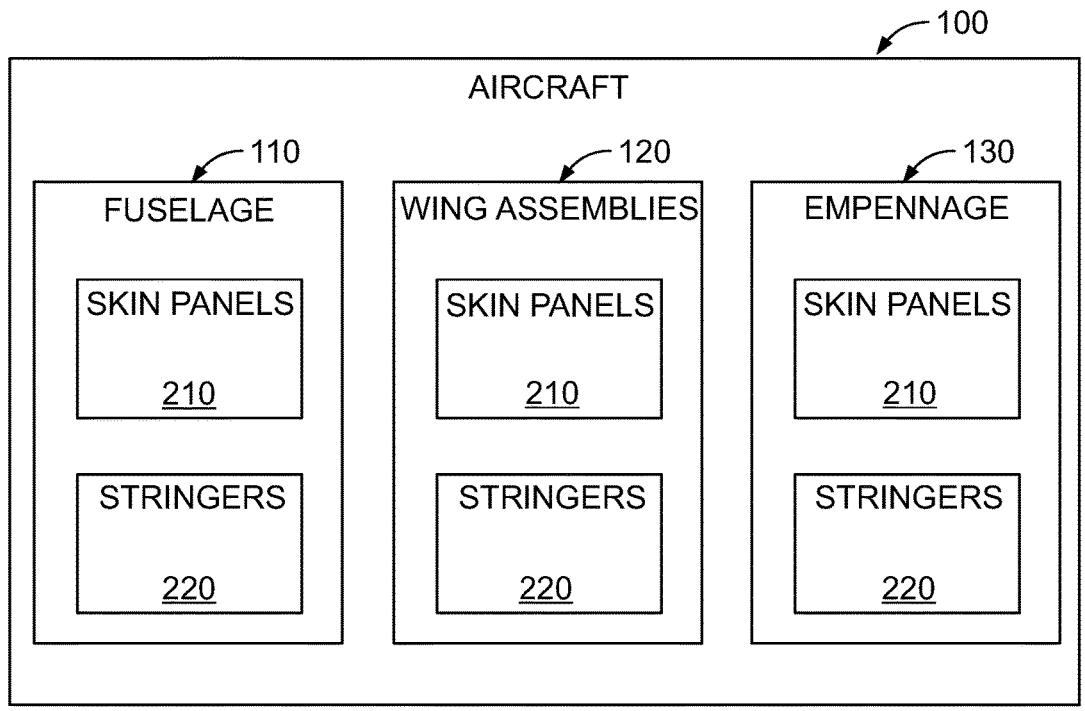
FIG. 2 is a schematic illustration of an aircraft having major aircraft assemblies, according to an embodiment of the present disclosure.

FIG. 2 is a schematic illustration of an aircraft 100 having major aircraft assemblies 110, 120, and 130, according to an embodiment of the present disclosure. Referring to FIGS. 1 and 2, each of the assemblies 110, 120 and 130 may include skin panels 210 and stiffeners. The stiffeners are configured to prevent the major assemblies 110, 120 and 130 from buckling. For example, the stiffeners may be configured to transfer bending loads in the skin panels 210, and stiffen the skin panels 210 so that the panels 210 do not buckle under loading. It is to be understood that the stiffeners are not limited to the major aircraft assemblies 110, 120 and 130. Indeed, stiffeners may be used in any aircraft structures that are to be stiffened.

A stringer is an example of a stiffener. Stringers 220 in the fuselage 110 may be subject to uniaxial tension and compression and out-of-plane buckling. The fuselage stringers 220 may also be subject to secondary loads including shear and bearing loads.

Each wing assembly 120 may include upper and lower stringers 220. The upper stringers 220 may be subject to uniaxial compression, while the lower stringers 220 may be subject to uniaxial tension (the primary loading is sometimes reversed). The upper and lower stringers 220 may also be subject to secondary loads including shear, bearing, and transverse loads.

The empennage 130 includes horizontal and vertical stabilizers. The stringers 220 in the stabilizers may be subject to similar primary and secondary loading as the wing assemblies 120.

A component under compression tends to twist, cripple and buckle. The stringer 220 provides strength, resists compression and tension, and provides stability against twist, cripple and buckle. For example, the stringer 220 provides a support structure within the component that may brace against various exerted forces.

Figure 3:
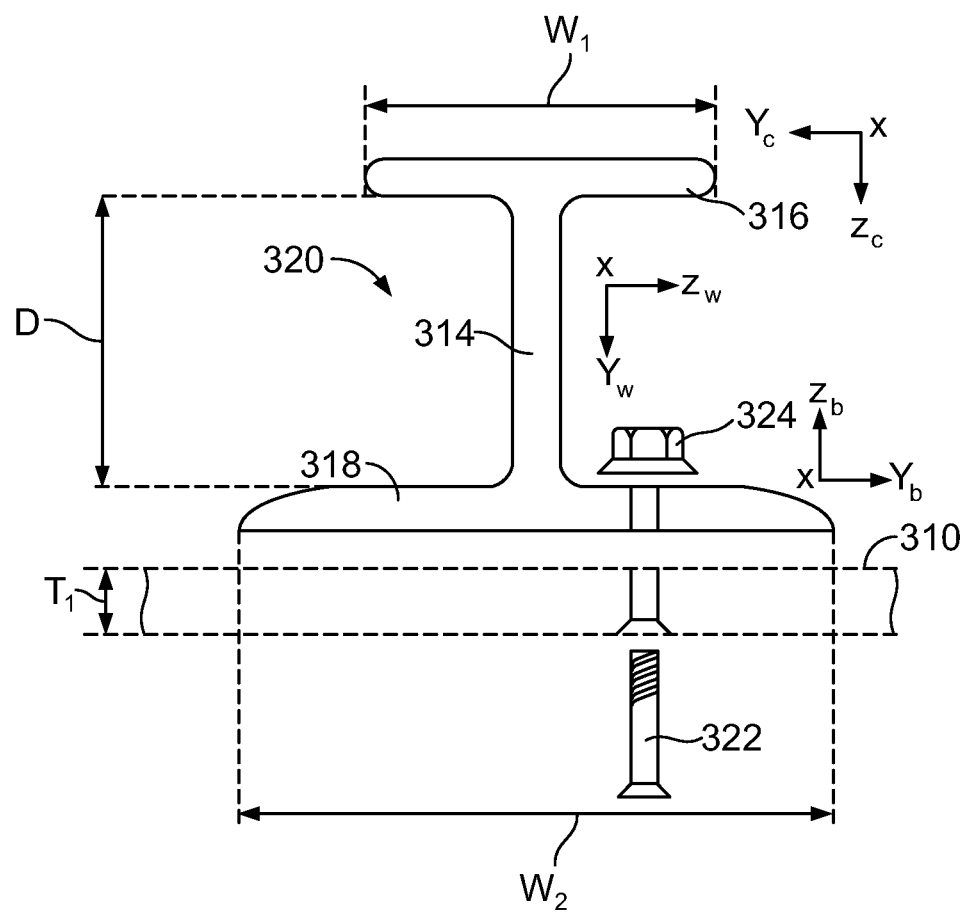
FIG. 3 is a diagrammatic representation of an end view of a skin panel and stringer, according to an embodiment of the present disclosure.

FIG. 3 is a diagrammatic representation of an end view of a skin panel 310 and stringer 320, according to an embodiment of the present disclosure. The stringer 320 is an example of a stringer 220, described with respect to FIG. 2. As shown in FIG. 3, the stringer 320 has an I-beam geometry. The stringer 320 may include a web 314 between first and second flanges 316 and 318. The web 314 has a depth D that provides a desired resistance to an applied loading.

The first and second flanges 316 and 318 may be generally planar members. The first flange 316, which may be referred to as a cap, has a width $W_1$. The second flange 318, which may be referred to as a base, has a width $W_2$. The web 314, cap 316 and base 318 extend in an X-direction along an X-axis (which is normal to the drawing sheet shown in FIG. 3). The X-axis is the axis of primary loading. The web 314, cap 316 and base 318 may have constant widths along the X-direction, or they may vary continuously or even non-continuously along the X-direction.

FIG. 3 also shows a coordinate system for each of the web 314 ($X$—$Y_w$—$Z_w$), cap 316 ($X$—$Y_c$—$Z_c$), and base 318 ($X$—$Y_b$—$Z_b$). The coordinate systems may correspond to an I-beam formed by back-to-back C-channels. Orientations of all reinforcing fibers may be measured with respect to the X-direction.

A stringer 220 herein is not limited to the I-beam geometry illustrated in FIG. 3. Other usable geometries include, but are not limited to Z-beams, blades, C-channels, and hat beams. Stringers having such geometries may include at least one web and base. Examples of hat, Z-beam and C-Channel geometries 410, 420 and 430, respectively, are illustrated in FIG. 4.

Referring again to FIG. 3, the skin panel 310, which has a thickness $T_1$, is coupled to the base 318. In at least one embodiment, the base 318 may be adhesively bonded to the skin panel 310. In at least one other embodiment, the base 318 may be co-cured with the skin panel 310.

The base 318 may be clamped to the skin panel 310 by fasteners 322. The fasteners 322 extend through apertures in the skin panel 310 and the base 318. The fasteners 322 are engaged by nuts 324 to impart a predetermined compressive force to the skin panel 310 and the base 318. The fasteners 322 may be used instead of, or in addition to, adhesive bonding.

Fasteners for clamping the stringers 320 to the skin panels 310 are not limited to bolts 322 and nuts 324. Other examples of fasteners include staples, z-pins, rivets, swage fasteners, and barbs. While fasteners such as bolts 322 extend entirely through a stringer base 318 and skin panel 310, fasteners such as staples, z-pins and barbs may extend partially into the skin panels. Fasteners such as staples, z-pins and barbs may be integral with the stringer bases.

In at least one embodiment, the stringers 320 may be secured to the skin panels 310 through stitching. Plies of fibers may be stitched together. Stitches may be threaded through apertures in a layup of dry composite plies. Resin is then infused in the structure, and the structure is cured.

The skin panel 310 may include a stack of plies of reinforcing fibers embedded in a matrix. Different plies may have fibers oriented at 0°, 45°, −45° and 90°, for example. Some embodiments may have a quasi isotropic layup, whereby equal amounts and percentages of 0°, 45°, −45° and 90° degree plies are used. In other embodiments, the different plies may include reinforcing fibers oriented at 10°, −55°, 100° and −35°, or some other angles or combinations. The reinforcing fibers in the skin panels 310 may be carbon fibers having an intermediate modulus of 40 MSI (megapounds per square inch). Ply stiffness of the skin panel 310 (for example, a stiffness of the carbon fibers plus resin) may have a modulus of 22-25 MSI. Stack stiffness along 0° may be 10-12 MSI.

The stringer 320 may include multiples plies of reinforcing fibers embedded in a matrix. The reinforcing fibers and matrix are not limited to any particular composition. Examples of the fibers include carbon fibers, glass fibers, aramid fibers, boron fibers, and titanium fibers. Examples of the matrix include plastic and metal. As another example, carbon fibers may be embedded in a plastic matrix. As yet another example, carbon fibers may be embedded in a titanium matrix. In some embodiments, the carbon fibers may have an intermediate modulus of 40 MSI, and ply stiffness may be 22-25 MSI.

Other types of stiffeners include spars and ribs. The stringers, spars, and ribs may form a frame of an aircraft, while skin panels are formed around the formed frame. Each of the stiffeners and skin plates may be formed from one or more composite membrane assemblies, each of which is formed by a plurality of stacked composite plies. The composite plies and the composite membrane assemblies may be formed as described below.

FIG. 5 is a diagrammatic representation of a lateral view of a composite ply 500, according to an embodiment of the present disclosure. The composite ply 500 may be used to form a composite membrane assembly, which may be used to form various structures (for example, stiffeners, ribs, spars, and skin panels of an aircraft), such as any of those described above. For example, the composite ply 500 may be sandwiched together with other composite plies to form a composite membrane assembly, which may then be used to form a stringer. In at least one embodiment, the composite membrane assembly may be used to form pre-preg or fiber tape, for example.

The composite ply 500 may be formed as a flat, planar sheet, for example, of reinforced fibers bonded together with a resin. As described below, one or more angled cuts may be formed in the composite ply to increase flexibility of the composite ply 500 without substantially reducing strength of a composite membrane assembly formed by a plurality of the composite plies 500.

The composite ply 500 includes a main body 501 that may be formed by or otherwise include a plurality of reinforced fibers 502. The reinforced fibers 502 may couple together through a resin, such as a glue, matrix, epoxy, liquid plastic, or the like, that is used to laminate the fibers 502 together. More or less fibers 502 may be used to form the composite ply 500. For example, the composite ply 500 may be formed from 3000 or more reinforced fibers. Optionally, the composite ply 500 may be formed from more or less reinforced fibers.

The composite ply 500 includes a base 504 connected to an opposite boundary surface 506 (for example, a top surface as shown by the orientation of the composite ply 500 in FIG. 5) through opposed ends 508 and 510 and opposed sides 511 (only one side is shown in FIG. 5). A longitudinal plane 512 extends through a length of the composite ply between the ends 508 and 510. The longitudinal plane 512 is shown extending through a center of the composite ply 500. However, the longitudinal plane 500 may be with respect to any level of the composite ply 500. The longitudinal plane 512 may generally be coplanar with the base 504 and the boundary surface 506. The longitudinal plane 512 is parallel to a length L of the composite ply 500. The length of a composite membrane assembly formed by a plurality of stacked composite plies may be referred to as a warp. A width of the composite membrane assembly (from side-to-side) may be referred to as a fill. The longitudinal plane is along a 0° direction of the fibers 502, in that the fibers 502 may extend in parallel direction to the length L. As shown, each fiber 502 may have a length that extends between the ends 508 and 510. Alternatively, one or more of the fibers 502 may have a length that extends in another direction, such as cross-wise to the length L.

The composite ply 500 may have a thickness t. For example, the thickness t may be 0.007" thick. In at least one other embodiment, the thickness t may be greater or lesser than 0.007" thick.

As shown, an angled cut 514 is formed through the composite ply 500 from the boundary surface 506 to the base 504. The cut 514 may be angled with respect to the longitudinal plane 512 (or the 0° direction) at an angle α, which may be non-orthogonal. That is, the angle α may be other than 90° with respect to the longitudinal plane 512 (or the 0° direction), or other than parallel to the longitudinal plane 512. In at least one embodiment, the angle α may exceed 0° and be less than 90°. For example, the angle α may be 10° in relation to the longitudinal plane 512 (or the 0° direction). As another example, the angle α may be 20° in relation to the longitudinal plane 512 (or the 0° direction). It has been found that an angle α from 10°-20° provides the composite ply 500 with a unique combination of increased flexibility and low loss of strength.

The angled cut 514 is formed by a straight, linear cut from the boundary surface 506 to the base 504. In this manner, the angled cut 514 is not concentrated in any one plane 516 that is perpendicular to the longitudinal plane 512. As such, the angled cut 514 is not concentrated at any one point, plane, or edge within or on the composite ply 500. Instead, the angled cut 514 is dispersed over a distance d that is substantially longer than a thickness p of the plane 516. As shown, the angled cut 514 is dispersed over the distance d that may be more than fifty times the thickness p of the plane 516. Optionally, the distance d may be less than fifty times the thickness p. For example, the distance d may be ten times the thickness p.

The distance d is inversely proportional to the absolute value of the magnitude of the angle α. For example, as the angle α increases, the distance d decreases. Accordingly, a smaller angle α provides an angled cut 514 that is dispersed over a longer distance d. Conversely, a greater angle α provides an angles cut 514 that is dispersed over a shorter distance d.

The angled cut 514 separates the composite ply 500 into separate segments 518 and 520 that are spliced together, such as through resin, at the interface of the angled cut 514. While the composite ply 500 is shown having a single angled cut 514, more angled cuts may be used.

The angled cuts 514 provide a degree of flexibility (that is, an ability to be stretched, pulled, or compressed in longitudinal directions that are parallel to the length L, and/or bent in directions relative to the length L) to the composite ply 500. For example, a typical piece of pre-preg tape has no flexibility. However, by forming the pre-preg from composite plies such as shown in FIG. 5, some degree of flexibility may be gained. For example, it has been found that the angled cuts 514 may increase flexibility of the composite ply 500 by at least 0.1%, upwards of 1%, 5%, or even more. In short, each angled cut 514 formed within a composite ply 500 may increase flexibility of the composite ply 500. At the same time, because the angled cuts 514 are dispersed over a relatively long distance (that is, not concentrated at or within a plane 516 that is perpendicular to the longitudinal plane 512), the composite ply 500 when stacked with other composite plies 500 having angled cuts that do no overlap, provides a composite membrane assembly (such as a membrane of pre-preg tape) that lose little, if any, strength. In contrast, the inventor has determined that a composite membrane assembly including composite plies that have vertically aligned perpendicular cuts at the same location are susceptible to tearing apart at the areas of the aligned perpendicular cuts. The inventor has found that a composite membrane assembly formed of composite layers having angled cuts that do not overlap with one another (but are, instead, staggered) increase the flexibility of the composite membrane assembly by at least 1%, while retaining strength similar to that of an uncut composite membrane assembly, such as 98% of the strength.

Figure 7:
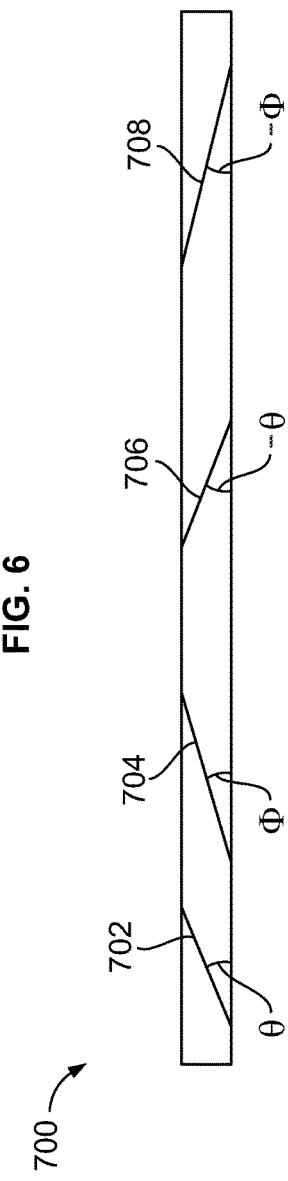
FIG. 7 is a diagrammatic representation of a lateral view of a composite ply, according to an embodiment of the present disclosure.

As noted, the angled cut 514 may be at an angle other than what is shown in FIG. 5. For example, the angle $\alpha$ of the angled cut 514 may be 10°, similar to that shown in FIG. 5. It has been found that an angle $\alpha$ of 10°-20° provides an increased combination of flexibility and strength (with the combination quantified, for example, as a sum of a percentage of ability to flex and a percentage of retained strength in relation to an uncut piece of composite material). Alternatively, the angle $\alpha$ may be various other angles, such as 30°, 45°, or the like. Indeed, the angle $\alpha$ may be any non-orthogonal angle. That is, the angle $\alpha$ may be any angle other than 0° or 90° with respect to the longitudinal axis 512. While an angle of 5° disperses the angular cut over a great distance d (and therefore increases an overall strength of a composite membrane assembly), it also provides a reduced flexibility as compared to an angle that is greater than 5°. Conversely, while an angle of 80° may have an increased flexibility as compared to an angle of 5°, the angle of 80° exhibits decreased strength in comparison to an angle of 5°. In short, the strength of the composite ply 500 may be inversely proportional to the absolute value of angle $\alpha$, while the flexibility of the composite ply 500 may be directly proportional to the absolute value of the angle $\alpha$. Note, the angle $\alpha$ may be measured from 0° to 90°, and negative values of angles therebetween (as shown with respect to FIG. 7, for example). For example, an angle $\alpha$ that may be considered 160° is −20° (as shown in FIG. 7, for example). Again, it has been found that an angle $\alpha$ in the range of 10° to 20°, or −10° to −20°, provides an increased combination of flexibility and strength.

Additionally, each of the ends 508 and 510 may be cut or otherwise formed at an angle, such as a non-orthogonal angle. If, for example, a structure is to be formed having a plurality of composite plies 500, some of which are shorter than others, 90° ends may form an abrupt step between adjacent plies. That is, 90° ends may cause steps in a layup. The steps may cause a wrinkle in the structure. As such, the ends 508 and 510 may be angled to disperse such a step over a greater distance, in the same manner that the angled cut 514 disperses the cut over a relatively long distance.

Figure 6:
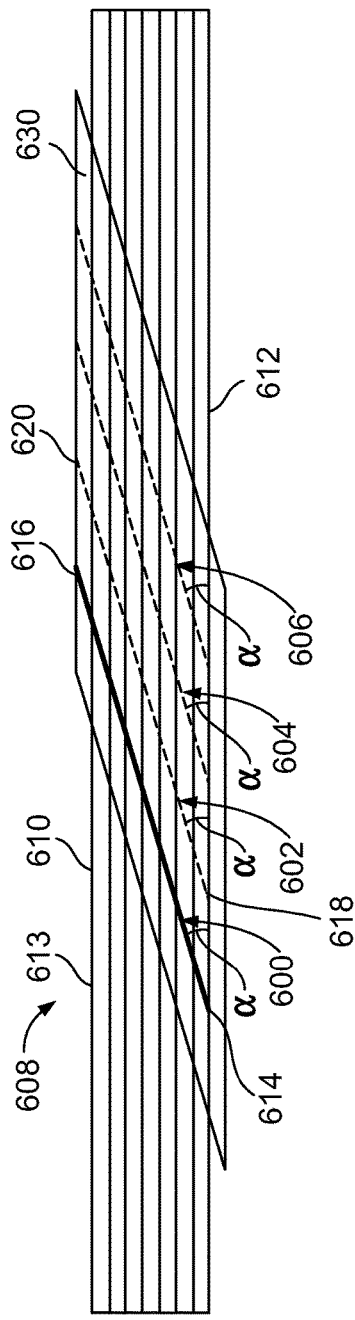
FIG. 6 is a diagrammatic representation of a lateral view of angled cuts formed in composite plies, according to an embodiment of the present disclosure.

FIG. 6 is a diagrammatic representation of a lateral view of angled cuts 600, 602, 604, and 606 formed in composite plies 610, according to an embodiment of the present disclosure. Note, each angled cut line (including the dashed line) is intended to show an angled cut in a different composite ply 610, not the same composite ply 610. As shown, the angled cuts may be formed at different locations of each composite ply 610. Therefore, when the composite plies 610 are stacked together (such as a base 612 of one composite ply being supported by an upper boundary surface 613 of another composite ply 610), the angled cuts 600, 602, 604, and 606 are staggered with respect to one another so that they do not completely align or otherwise overlay one another. Further, in the stacked orientation, the angled cuts 600, 602, 604, and 606 do not directly connect together to form a single contiguous cut that extends through adjacent composite plies 610. At least portions of each angled cut 600, 602, 604, and 606 may not overlap portions of other angled cuts 600, 602, 604, and 606 of stacked composite plies 610.

For example, as shown in FIG. 6, each of the angled cuts 600, 602, 604, and 606 may be formed at the same angle $\alpha$ from a boundary surface 613 to a base 612. However, the terminal ends of each angled cut 600 do not align at the same points. Instead, the angled cut 600 extends from between a first base point 614 to a first boundary point 616 that is offset or shifted from a second base point 618 and a second boundary point 620, respectively, of the angled cut 602. The other angled cuts 604 and 606 may be offset or shifted in a similar manner. As such, when the composite plies 610 are stacked together, the terminal ends of each angled cut 600, 602, 604, and 606 may not overlap or connect with one another, but, instead, may be staggered. For example, terminal ends of each of the angled cuts 600, 602, 604, and 606 do not abut into or otherwise form a contiguous cut with a terminal end of any other of the angled cuts.

By staggering the angled cuts 600, 602, 604, and 606 of composite plies 610 of a stacked composite membrane assembly, the strength of the overall composite membrane assembly is substantially retained, due to the fact that a single contiguous cut is not formed unimpeded through a thickness of a composite membrane assembly formed by the stacked composite plies 610 or through adjacent composite plies 610. It has been found that staggering the angled cuts in such a manner leads to a stacked composite membrane assembly that retains 98% or more of its strength (that is, 98% of the strength of a composite membrane assembly formed of plies having no cuts). At the same time, the angled cuts provide the stacked composite membrane assembly with flexibility that allows the stacked composite membrane assembly to form or otherwise conform to a curved shape without wrinkling.

One or more cover plies 630 may wrap around portions of the composite plies 610 or a stacked composite membrane assembly formed of multiple composite plies 610 at areas where each composite ply 610 is cut. The cover pl(ies) 630 provide a bracing support that prevents or otherwise reduces the risk of the segments between angled cuts from separating. If, for example, the angled cuts formed in a plurality of composite plies reduce the strength of a stacked composite membrane assembly by 2%, the cover pl(ies) 630 may strengthen the stacked composite membrane assembly so that it has 100% (or closer to 100%) of the strength of a stacked composite membrane assembly formed of uncut composite plies.

FIG. 7 is a diagrammatic representation of a lateral view of a composite ply 700, according to an embodiment of the present disclosure. The composite ply 700 is similar to those described above. Angled cuts 702, 704, 706, and 708 are formed at different locations within the composite ply. The angled cut 702 may be at an angle $\theta$, while the angled cut 704 may be at an angle $\Phi$ that differs from the angle $\theta$. The angled cut 706 may be at an angle $-\theta$, which is opposite from the angle $\theta$, while the angled cut 708 may be at an angle $-\Phi$, which is opposite from the angle $\Phi$. More or less angled cuts may be formed in the composite ply. Further, each angled cut may be at another angle than shown. Moreover, the angles 706 and 708 may be angles other than −θ and −Φ. The magnitude and direction of each angle may be based on a desired curvature of a structure to be formed by a plurality of stacked composite plies. For example, angled cuts of increased magnitude in one direction may be used to form a structural segment having an increased curvature in a particular direction. As another example, angled cuts of decreased magnitude in one direction may be used to form a structural segment having a reduced curvature in a particular direction. As noted, each composite ply that forms a composite membrane assembly may have angled cuts that are staggered with respect to one another.

Figure 8:
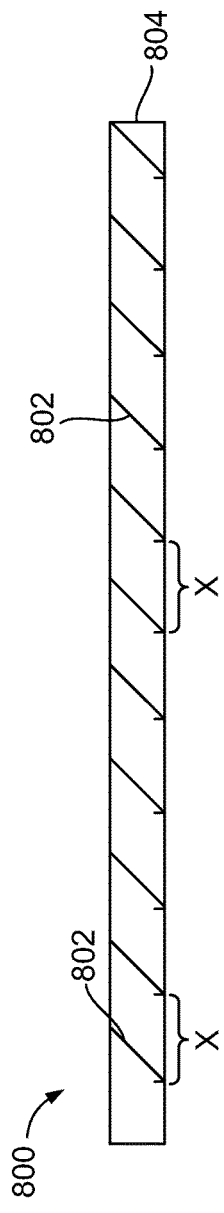
FIG. 8 is a diagrammatic representation of a lateral view of a composite ply, according to an embodiment of the present disclosure.

FIG. 8 is a diagrammatic representation of a lateral view of a composite ply 800, according to an embodiment of the present disclosure. As shown, the composite ply 800 includes a plurality of angled cuts 802 that regularly repeat. For example, a distance x between neighboring cuts may be the same between all neighboring cuts. Alternatively, the distance between angled cuts may be different among different sets of neighboring cuts. Moreover, the angle of each angled cut may be the same or different. As shown, a terminal end 804 of the composite ply 800 may include a ramped surface formed by an angled cut.

Figure 9:
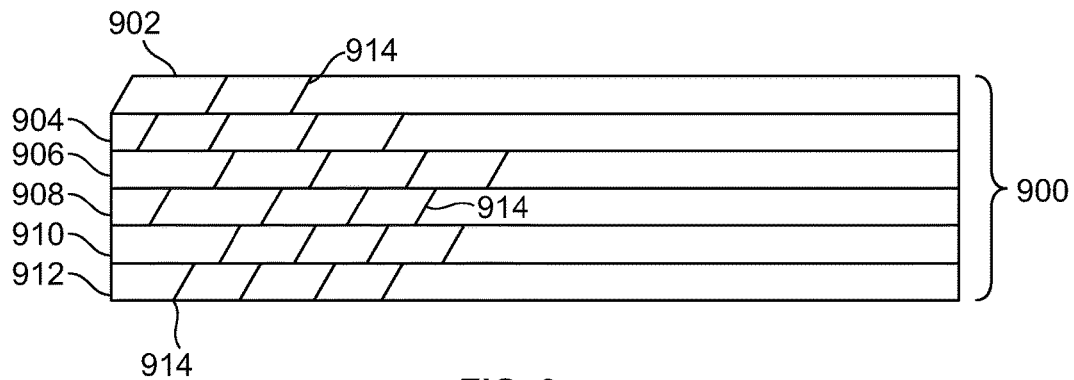
FIG. 9 is a diagrammatic representation of a lateral view of a stacked composite membrane assembly formed by a plurality of composite plies, according to an embodiment of the present disclosure.

FIG. 9 is a diagrammatic representation of a lateral view of a stacked composite membrane assembly 900 formed by a plurality of composite plies 902, 904, 906, 908, 910, and 912. As shown, the angled cuts 914 of adjacent plies 902-912 may not overlap with one another. Instead, the angled cuts 914 of neighboring plies 902-912 may be staggered or otherwise offset with respect to one another. The stacked composite membrane assembly 900 may include more or less composite plies than shown. Notably, none of the angled cuts 914 between adjacent composite plies 902-912 abut one another to form so as to form a contiguous cut between adjacent plies 902-912.

Figure 10:
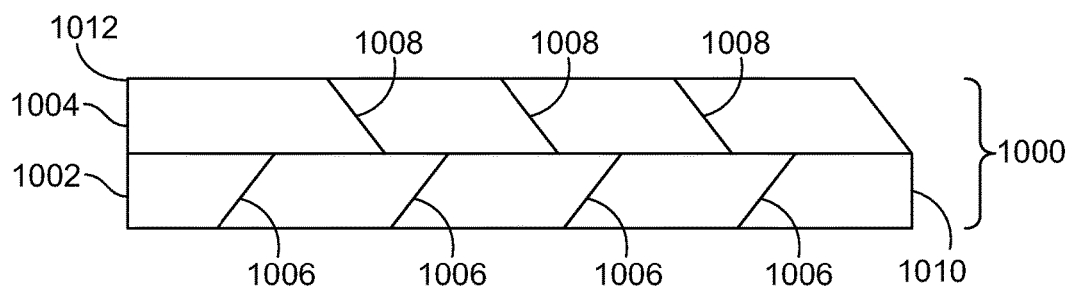
FIG. 10 is a diagrammatic representation of a lateral view of a stacked composite membrane assembly formed by a plurality of composite plies, according to an embodiment of the present disclosure.

FIG. 10 is a diagrammatic representation of a lateral view of a stacked composite membrane assembly 1000 formed by a plurality of composite plies 1002 and 1004, according to an embodiment of the present disclosure. For the sake of simplicity, only two plies 1002 and 1004 are shown in FIG. 10. It is to be understood, however, that the stacked composite membrane assembly 1000 may be formed from more composite plies than shown.

The composite ply 1002 includes a plurality of angled cuts 1006, while the composite ply 1004 includes a plurality of angled cuts 1008. More or less angled cuts 1006 and 1008 may be formed in the composite plies 1002 and 1004, respectively. Further, the angled cuts 1006 and 1008 may be formed at other non-orthogonal angles than shown.

The angled cuts 1006 are oriented in a first direction in that they are canted toward an end 1010. In contrast, the angled cuts 1008 are oriented in a second direction that is opposite from the first direction in that they are canted toward an end 1012. As shown, the orientation of the angles may alternate between adjacent composite plies 1002 and 1004, such that the angled cuts of the composite ply 1002 are opposite to those of the composite ply 1004. In at least one other embodiment, at least some neighboring angled cuts in the same composite ply may alternate in different directions, and may be in an inverse relationship with respect to angled cuts of an adjacent composite ply.

Figure 11A:
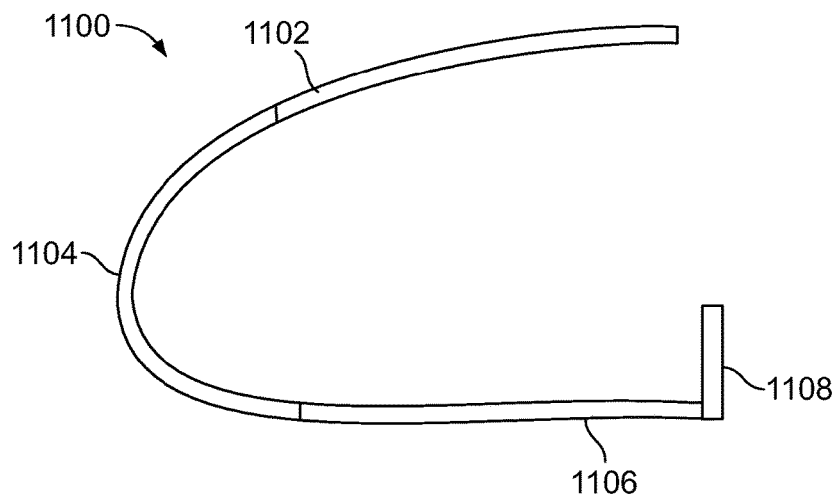
FIG. 11A is a diagrammatic representation of a lateral view of a formed stacked composite membrane assembly, according to an embodiment of the present disclosure.

FIG. 11A is a diagrammatic representation of a lateral view of a formed stacked composite membrane assembly 1100, according to an embodiment of the present disclosure. The stacked composite membrane assembly 1100 includes a first curved segment 1102 having a first curvature. The first curved segment 1102 connects to a second curved segment 1104 having a second curvature that exceeds that of the first curvature 1104. For example, the first curved segment 1102 may be a mild double curved surface, while the second curved segment 1104 may be a high degree double curved surface. The second curved segment 1104 connects to a first flat segment 1106, which, in turn connects to a second flat segment 1108 at a right angle (which is a simple folded surface). Each segment 1102, 1104, 1106, and 1108 may be formed by multiple composite plies.

Each of the composite plies of the first curved segment 1102 may include a plurality of angled cuts separated a first distance from one another. The angled cuts of adjacent composite plies may be staggered. The composite plies of the second curved segment 1104 may include a plurality of angled cuts separated a second distance from one another. In one embodiment, the second distance is shorter than the first distance, as the curvature of the second curved segment exceeds that of the first curved segment 1102. As such, the second curved segment 1104 may include a greater number of angled cuts at closer distances, which facilitates a curvature of increased magnitude. Optionally, the angle of the cuts may be adjusted (as noted above) to accommodate the curvatures. In short, the number of staggered angled cuts in composite plies that form a particular portion of a composite membrane assembly may be directly proportional to an amount of curvature of the particular portion of the composite membrane assembly. That is, the number of angled cuts in each ply may increase as the degree of curvature increases.

The first and second flat segments 1106 and 1108 may be formed by a plurality of composite plies having no cuts formed therein. Because the first and second flat segments 1106 and 1108 do not include any double curved surfaces, there is little or no risk of the segments 1106 and 1108 wrinkling, for example. As such, the flat segments 1106 and 1108 may be devoid of formed cuts.

Figure 11B:
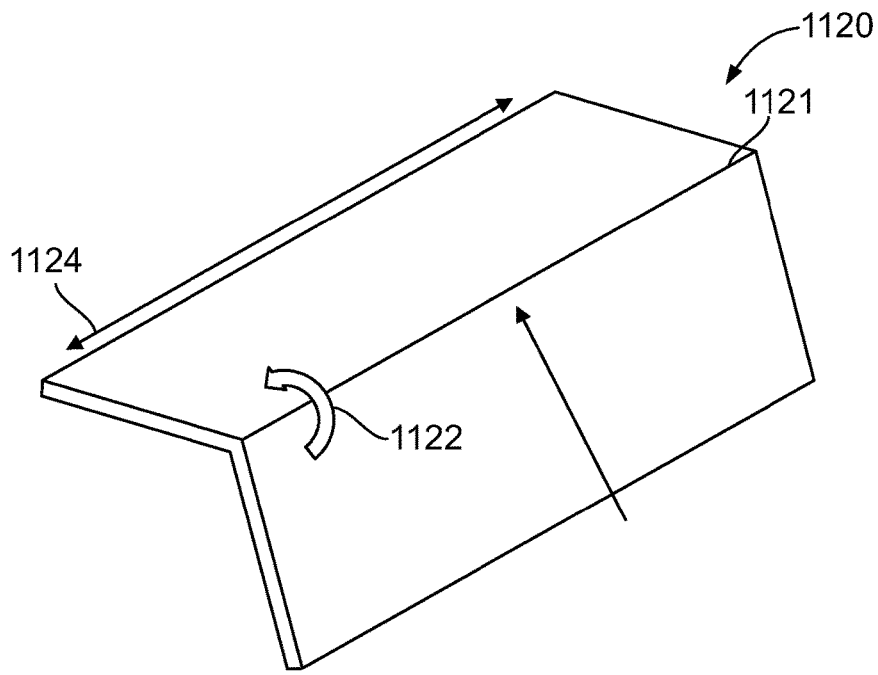
FIG. 11B is a diagrammatic representation of a top perspective view of a composite material being folded along a linear edge, according to an embodiment of the present disclosure.

FIG. 11B is a diagrammatic representation of a top perspective view of a composite material 1120 being folded along a linear edge 1121, according to an embodiment of the present disclosure. The linear edge 1121 is straight and the composite material 1120 may be folded about the linear edge in the direction of arc 1122. Because the composite material 1120 is folded with respect to the straight, linear edge 1121, the composite material 1120 does not stretch and strain with respect to a direction 1124 that is parallel to the linear edge 1121. As such, the composite material 1120 may be formed of composite plies that do not have cuts formed therein, as there is little or no risk of the composite material 1120 wrinkling.

Figure 11C:
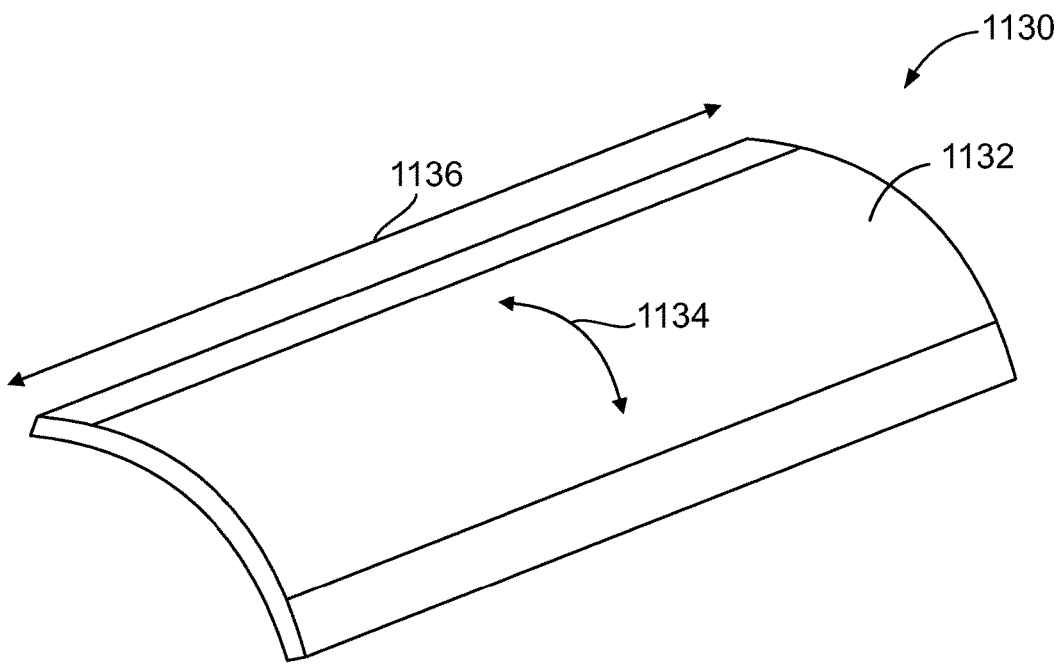
FIG. 11C is a diagrammatic representation of a top perspective view of a composite material having a single curved surface, according to an embodiment of the present disclosure.

FIG. 11C is a diagrammatic representation of a top perspective view of a composite material 1130 having a single curved surface 1132, according to an embodiment of the present disclosure. The composite material 1130 curves with respect to a single arcuate direction 1134. Because the composite material 1130 curves with respect to a single direction 1134, the composite material 1130 does not stretch and strain with respect to a direction 1136 that is parallel to its length. As such, the composite material 1130 may be formed of composite plies that do not have cuts formed therein, as there is little or no risk of the composite material 1130 wrinkling.

Figure 11D:
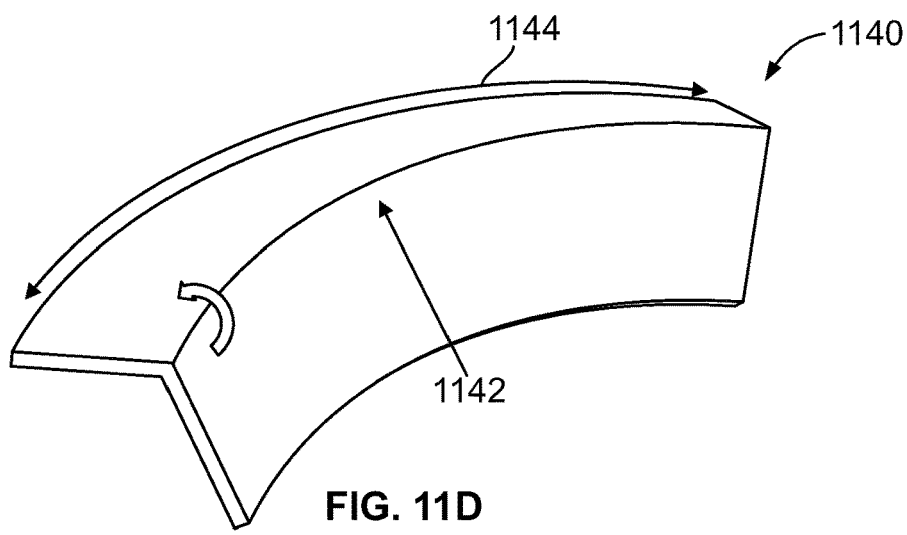
FIG. 11D is a diagrammatic representation of a top perspective view of a composite material folded along a curved edge, according to an embodiment of the present disclosure.

FIG. 11D is a diagrammatic representation of a top perspective view of a composite material 1140 folded along a curved edge 1142, according to an embodiment of the present disclosure. The curved edge 1142 has an arcuate shape that may stretch and strain the composite material 1140 along its length in the direction of arc 1144. Accordingly, the composite material 1140 may be susceptible to wrinkling, for example. In order to control, eliminate, minimize, or otherwise reduce such wrinkling, the composite material 1140 may be formed of plies having a plurality of angled cuts, as described above. The angled cuts of adjacent composite plies may be staggered.

Figure 11E:
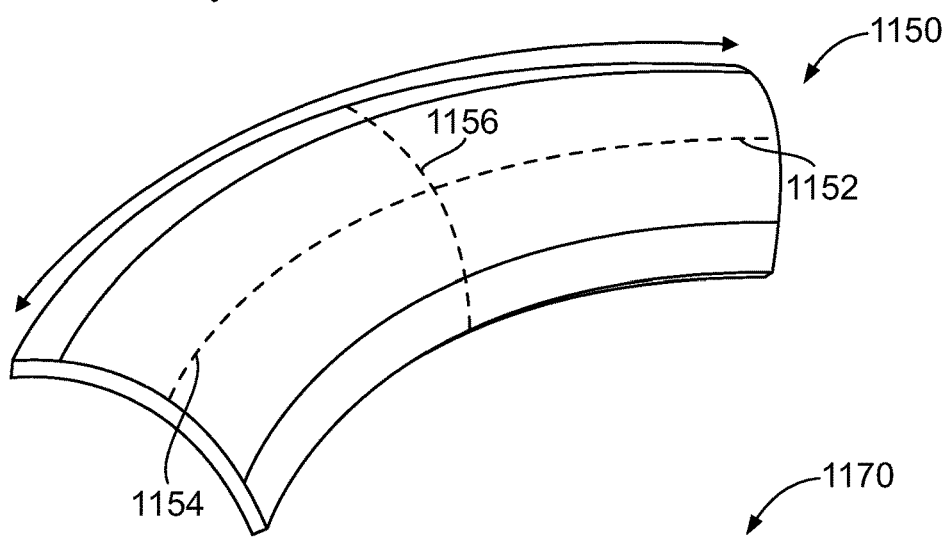
FIG. 11E is a diagrammatic representation of a top perspective view of a composite material having a double curved surface, according to an embodiment of the present disclosure.

FIG. 11E is a diagrammatic representation of a top perspective view of a composite material 1150 having a double curved surface 1152, according to an embodiment of the present disclosure. The double curved surface 1152 curves with respect to the length 1154 and width 1156 of the composite material 1150. As such, the composite material 1150 may be susceptible to wrinkling, for example. In order to control, eliminate, minimize, or otherwise reduce such wrinkling, the composite material 1150 may be formed of plies having a plurality of angled cuts, as described above. The angled cuts of adjacent composite plies may be staggered.

Figure 11F:
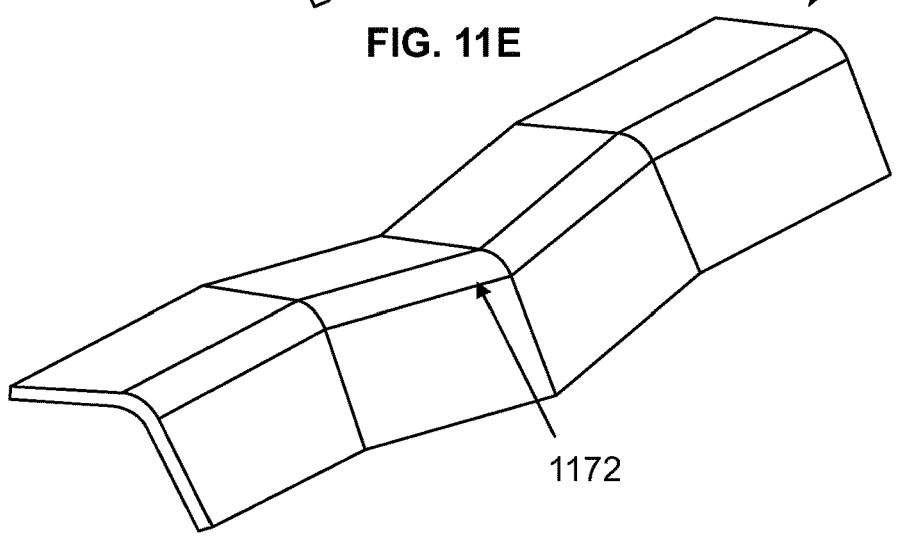
FIG. 11F is a diagrammatic representation of a top perspective view of a composite material having a jogged and curved transition edge, according to an embodiment of the present disclosure.

FIG. 11F is a diagrammatic representation of a top perspective view of a composite material 1170 having a jogged and curved transition edge 1172, according to an embodiment of the present disclosure. As shown, the composite material 1170 may have a complex shape of various curves in different directions. The composite material 1170 shears and stretches. In order to control, eliminate, minimize, or otherwise wrinkling, the composite material 1170 may be formed of plies having a plurality of angled cuts, as described above. The angled cuts of adjacent composite plies may be staggered.

Figure 12:
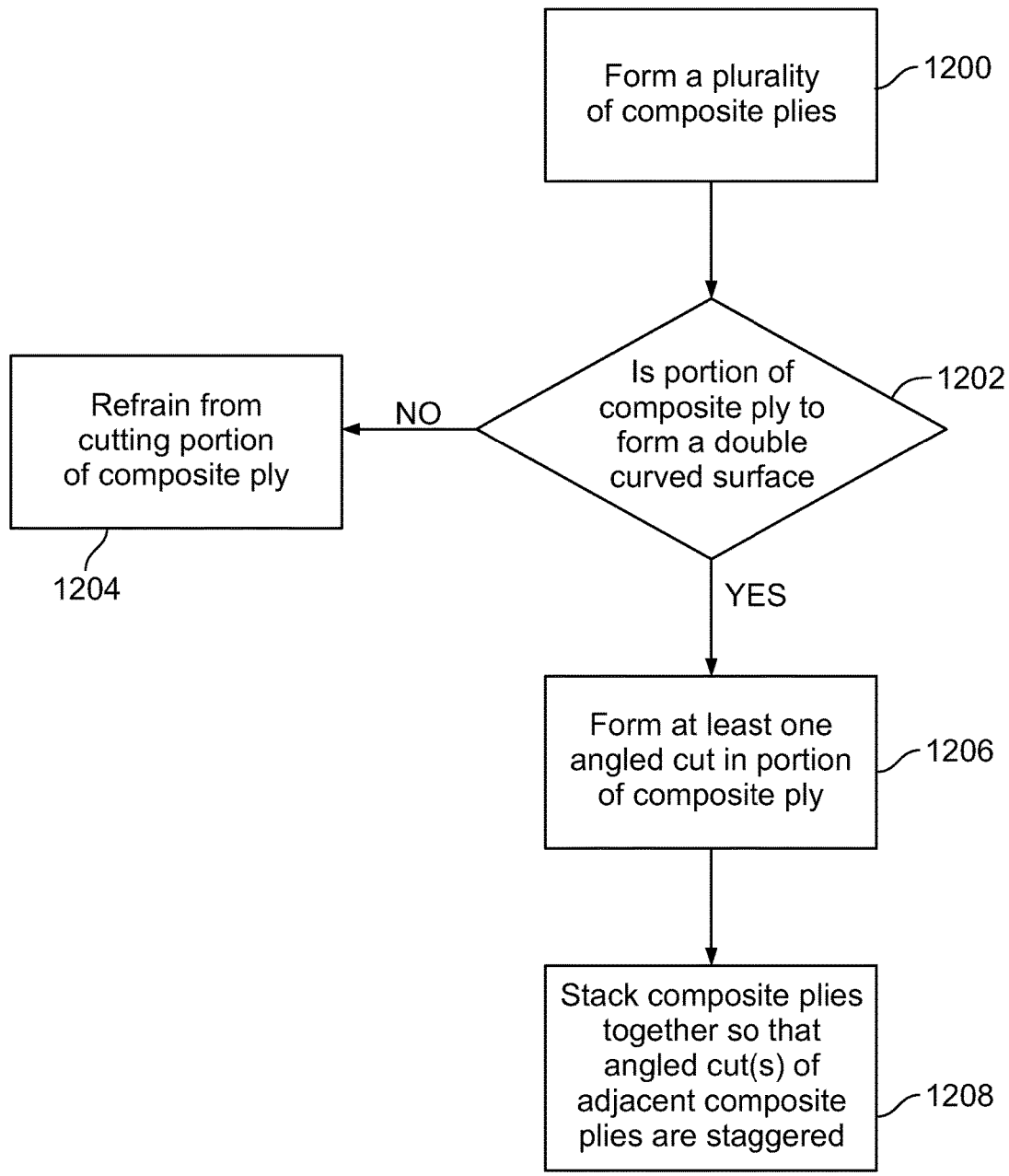
FIG. 12 illustrates a flow chart of a method of forming a composite membrane assembly, according to an embodiment of the present disclosure.

FIG. 12 illustrates a flow chart of a method of forming a composite membrane assembly, according to an embodiment of the present disclosure. At 1200, a plurality of composite plies are formed. One or more of composite plies may include reinforced fibers coupled together through resin, for example. Each composite play may be a planar sheet having a warp, fill, and thickness. Optionally, each composite ply may be akin to a string or ribbon having a warp and thickness, but minimal fill.

At 1202, it is determined if a portion of one or more of the composite plies is to form a double curved surface. If not, the method proceeds to 1204, in which no cut is formed through the portion of the composite ply.

If, however, the portion of each composite ply is to form a curved surface, the method proceeds from 1202 to 1206, in which at least one angled cut is formed in the portion of the composite ply. Then, at 1208, the composite plies are stacked together so that the angled cut(s) of adjacent composite plies are staggered with respect to one another.

Referring to FIGS. 1-12, embodiments of the present disclosure provide composite membrane assemblies that may be formed by a plurality of stacked composite plies. The composite membrane assemblies may be used to form various structures of an aircraft, for example, such as stiffeners and skin panels. Angled cuts may be formed in each of the composite plies. The angled cuts of the stacked composite plies may be staggered in relation to one another. The angled cuts of the composite plies provide a degree of flexibility to a composite membrane assembly, while the staggered relationship among cuts of stacked composite plies substantially maintains the strength of the composite membrane assembly (in relation to a membrane having plies that are uncut). The angled cuts provide flexibility (for example, an ability to stretch) to the composite membrane assembly (such as fiber tape) so that they do not break or crack when being folded to form (or to conform to) a curved shape. Further, the flexibility provided by the angled cuts eliminates, minimizes, or otherwise reduces wrinkles in the composite plies and the composite membrane assembly formed by stacked composite plies.

It has been found that forming a composite membrane assembly from 10 or more composite plies as described above provides both strength and flexibility to the formed composite membrane assembly. For example, using only two composite plies may lead to a composite membrane assembly with reduced strength, due to the existence of two separate cuts, each of which spans through 50% of the formed composite membrane assembly. However, by increasing the number of composite plies and staggering the angled cuts, a single contiguous cut through a percentage of thickness of the composite membrane assembly is reduced. For example, if ten composite plies are used to form a composite membrane assembly, a single contiguous cut through any portion of formed composite membrane assembly does not exceed 10% of the thickness of the composite membrane assembly (as cuts of adjacent plies are staggered with respect to one another). If twenty composite plies are used to form a composite membrane assembly, a single contiguous cut through any portion of the formed composite membrane assembly does not exceed 5% of the thickness of the composite membrane assembly, and so on.

As described above, embodiments of the present disclosure provide an improved system and method of forming a composite material that is able to stretch to accommodate curved surfaces without wrinkling, while substantially maintaining strength.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite ply configured to form a composite membrane assembly along with a plurality of other composite plies, the composite ply comprising:
    a main body of reinforced fibers connected together with a resin, wherein the main body includes a base connected to an opposed boundary surface through opposed ends and opposed sides,
    wherein at least one non-orthogonal cut relative to a length of the main body is formed through a thickness of the main body between the opposed ends from the base to the boundary surface, wherein the at least one non-orthogonal cut formed through the thickness of the main body is opposite from at least one other non-orthogonal cut formed through a thickness of an adjacent composite ply.

2. The composite ply of claim 1, wherein the at least one non-orthogonal cut is staggered with respect to the at least one other non-orthogonal cut of the adjacent composite ply so that the at least one non-orthogonal cut does not form a contiguous linear cut with the at least one other non-orthogonal cut of the adjacent composite ply.

3. The composite ply of claim 1, wherein the non-orthogonal cut forms a non-orthogonal angle with respect to a longitudinal plane of the composite ply, wherein the longitudinal plane extends between the opposed ends and is parallel with one or both of the base and the opposed boundary surface.

4. The composite ply of claim 3, wherein the non-orthogonal angle is at least 5° and no more than 80°.

5. The composite ply of claim 3, wherein the non-orthogonal angle is at least 10° and no more than 20°.

6. The composite ply of claim 1, wherein the at least one non-orthogonal cut forms ply segments that are spliced together.

7. The composite ply of claim 1, wherein the at least one non-orthogonal cut comprises a plurality of non-orthogonal cuts.

8. The composite ply of claim 7, wherein the plurality of non-orthogonal cuts are formed at a same angle.

9. The composite ply of claim 7, wherein at least two of the plurality of non-orthogonal cuts are formed at different angles.

10. The composite ply of claim 7, wherein at least two of the plurality of non-orthogonal cuts are oriented in different directions.

11. A composite membrane assembly comprising:
    a plurality of stacked composite plies, wherein each of the plurality of stacked composite plies comprises:
        a main body of reinforced fibers connected together with a resin, wherein the main body includes a base connected to an opposed boundary surface through opposed ends and opposed sides,
        wherein at least one non-orthogonal cut relative to a length of the main body is formed through a thickness of the main body between the opposed ends from the base to the boundary surface, and
        wherein the at least one non-orthogonal cut is opposite from and staggered with respect to at least one other non-orthogonal cut formed through a thickness of an adjacent composite ply so that the at least one non-orthogonal cut does not form a contiguous linear cut with the at least one other non-orthogonal cut of the adjacent composite ply.

12. The composite ply of claim 11, wherein the non-orthogonal cut forms a non-orthogonal angle with respect to a longitudinal plane of the composite ply, wherein the longitudinal plane extends between the opposed ends and is parallel with one or both of the base and the opposed boundary surface, and wherein the non-orthogonal angle is at least 10° and no more than 20°.

13. The composite ply of claim 11, wherein the at least one non-orthogonal cut forms ply segments that are spliced together.

14. The composite ply of claim 11, wherein the at least one non-orthogonal cut comprises a plurality of non-orthogonal cuts.

15. The composite ply of claim 14, wherein the plurality of non-orthogonal cuts are formed at a same angle.

16. The composite ply of claim 14, wherein at least two of the plurality of non-orthogonal cuts are formed at different angles.

17. The composite ply of claim 14, wherein at least two of the plurality of non-orthogonal cuts are oriented in different directions.

18. A method of forming a composite membrane assembly, the method comprising:
    forming a plurality of composite plies, wherein the plurality of composite plies is ten or more composite plies, wherein each of the plurality of composite plies includes a main body of reinforced fibers connected together with a resin, wherein the main body includes a base connected to an opposed boundary surface through opposed ends and opposed sides;
    forming at least one non-orthogonal cut relative to a length of the main body in at least one of the plurality of composite plies, wherein the forming at least one non-orthogonal cut operation comprises (a) forming the at least one non-orthogonal cut through a thickness of the main body between the opposed ends from the base to the boundary surface, and (b) forming the at least one non-orthogonal cut through the thickness of the main body opposite from at least one other non-orthogonal cut formed through a thickness of an adjacent composite ply; and
    stacking the composite plies together so that the non-orthogonal cuts of adjacent composite plies are staggered with respect to one another.

19. The method of claim 18, wherein the forming the at least one non-orthogonal cut operation comprises forming the at least one non-orthogonal cut that is at least 10° and no more than 20° with respect to longitudinal axes of the plurality of composite plies.

20. The method of claim 18, wherein the forming the at least one non-orthogonal cut operation comprises forming a plurality of non-orthogonal cuts in the plurality of composite plies.

\* \* \* \* \*